(12) United States Patent
Takeyama et al.

(10) Patent No.: US 12,541,012 B2
(45) Date of Patent: Feb. 3, 2026

(54) OPTICAL DETECTION DEVICE, OPTICAL DISTANCE MEASUREMENT DEVICE, AND NON-TRANSITORY COMPUTER READABLE MEDIUM

(71) Applicant: FUJIFILM Business Innovation Corp., Tokyo (JP)

(72) Inventors: Kei Takeyama, Ebina (JP); Junichiro Hayakawa, Ebina (JP); Daisuke Iguchi, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 840 days.

(21) Appl. No.: 17/890,688

(22) Filed: Aug. 18, 2022

(65) Prior Publication Data
US 2023/0243937 A1 Aug. 3, 2023

(30) Foreign Application Priority Data
Feb. 2, 2022 (JP) .................. 2022-014668

(51) Int. Cl.
*G01S 7/4861* (2020.01)
*G01S 7/4865* (2020.01)
(Continued)

(52) U.S. Cl.
CPC .......... *G01S 7/4861* (2013.01); *G01S 7/4865* (2013.01); *G01S 7/4876* (2013.01); *G01S 17/10* (2013.01); *G01S 17/89* (2013.01)

(58) Field of Classification Search
CPC ....... G01S 7/4876; G01S 7/487; G01S 7/4815
See application file for complete search history.

(56) References Cited

U.S. PATENT DOCUMENTS 11,092,678 B2  8/2021  Barnes et al.
2015/0241564 A1  8/2015  Takano
(Continued)

FOREIGN PATENT DOCUMENTS

JP  2007-333592 A  12/2007
JP  2011-185707 A  9/2011
(Continued)

OTHER PUBLICATIONS

Jun. 28, 2023 Extended Search Report issued in European Patent Application No. 22198682.1.
(Continued)

*Primary Examiner* — Shawn Decenzo
(74) *Attorney, Agent, or Firm* — Oliff PLC

(57) ABSTRACT

An optical detection device includes a light emitter that irradiates an area of interest; a light receiver that receives reflected light that has been emitted by the light emitter and reflected on a detection object, the light receiver including plural light-receiving elements divided into plural light reception sections; and a processor configured to perform at least one of full irradiation for irradiating the whole area of interest and full light reception for outputting all light reception results and at least one of partial irradiation for irradiating part of the area of interest and partial light reception for outputting part of the light reception results one part by one part and perform an object detection process for detecting the detection object in accordance with light received by the light receiver. The processor is configured to, based on a difference between an amount of received light received at each of the light reception sections at a time when the light emitter performs the full irradiation and an amount of received light received at each of the light reception sections at a time when the light emitter performs the partial irradiation, perform an indirect light detection
(Continued)

process for detecting that at least one of the plural light reception sections receives indirect light when the light emitter performs the full irradiation.

20 Claims, 12 Drawing Sheets

(51) Int. Cl.
*G01S 7/487* (2006.01)
*G01S 17/10* (2020.01)
*G01S 17/89* (2020.01)

(56) References Cited

U.S. PATENT DOCUMENTS

| | | | |
|---|---|---|---|
| 2017/0115497 A1* | 4/2017 | Chen | H04N 13/207 |
| 2019/0101628 A1* | 4/2019 | Roger | G01S 17/42 |
| 2019/0391238 A1* | 12/2019 | Barnes | G01S 7/4808 |
| 2019/0391270 A1 | 12/2019 | Uehara | |
| 2020/0400791 A1* | 12/2020 | Fujiwara | G01C 3/06 |
| 2021/0033711 A1* | 2/2021 | Helsloot | G01S 7/4817 |
| 2021/0333405 A1* | 10/2021 | Shia | G01S 7/486 |
| 2022/0007482 A1 | 1/2022 | Ogura et al. | |

FOREIGN PATENT DOCUMENTS

| | | |
|---|---|---|
| JP | 2017-015448 A | 1/2017 |
| JP | 2019-028039 A | 2/2019 |
| JP | 2019-219400 A | 12/2019 |
| JP | 2020-076619 A | 5/2020 |
| WO | 2014/097539 A1 | 6/2014 |
| WO | 2021/205787 A1 | 10/2021 |

OTHER PUBLICATIONS

Nov. 11, 2024 Office Action issued in European Patent Application No. 22 198 682.1.

Apr. 25, 2024 Office Action issued in European Patent Application No. 22 198 682.1.

Japanese Patent Application No. 2021-051645, filed on Mar. 25, 2021.

Nov. 25, 2025 Office Action issued in Japanese Application No. 2022-014668.

* cited by examiner

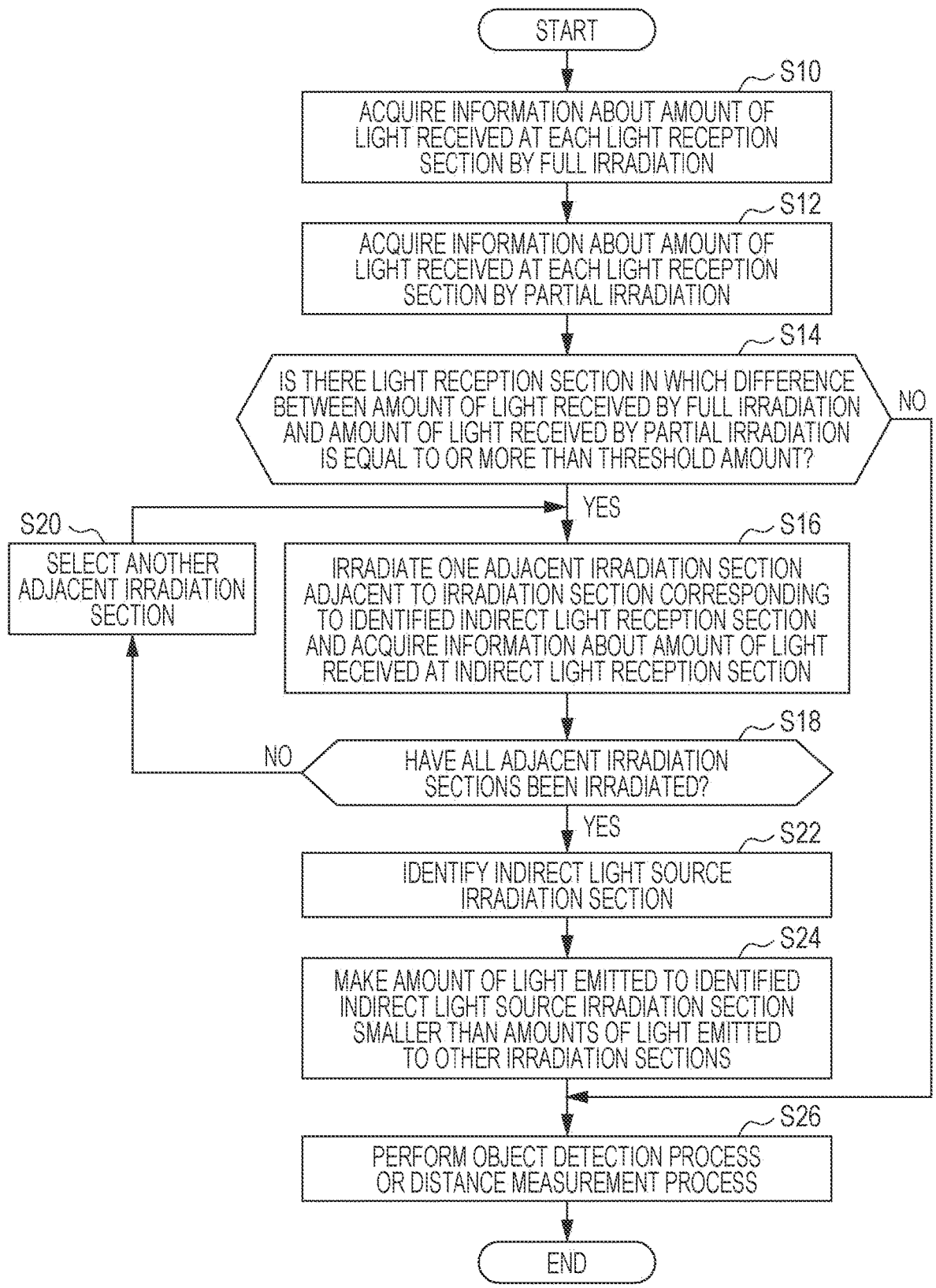

OPTICAL DETECTION DEVICE, OPTICAL DISTANCE MEASUREMENT DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-014668 filed Feb. 2, 2022.

BACKGROUND

(i) Technical Field

The present disclosure relates to an optical detection device, an optical distance measurement device, and a non-transitory computer readable medium.

(ii) Related Art

Optical detection devices that measure the distance to a measurement object are suggested in, for example, Japanese Unexamined Patent Application Publication Nos. 2019-219400, 2019-028039, 2017-15448, 2007-333592, and 2020-76619. In the optical detection devices, a light emitter irradiates a measurement object with light, a light receiver receives reflected light reflected from the measurement object, and the distance to the measurement object is measured based on the reflected light received at the light receiver.

SUMMARY

An optical detection device performs object detection, in which a light emitter irradiates a detection object with light, a light receiver receives reflected light reflected on the detection object and the like (including the background of the detection object), and the detection object is detected or the distance to the detection object is measured on the basis of the received reflected light. However, in some cases, light emitted from the light emitter is not applied to the detection object through an assumed optical path or reflected light from the detection object is not received through an assumed optical path by the light receiver. In such cases, the light receiver may receive light called indirect light. If the light receiver receives a large amount of indirect light, the accuracy of detection of the detection object or the accuracy of measurement of the distance to the detection object decreases. Indirect light may be, for example, reflected light that has been emitted from the light emitter, reflected on an object different from the detection object, applied to the detection object, and reflected from the detection object or reflected light that is multiple-reflected through lenses provided on a reflected light path from the detection object to the light receiver and then received by the light receiver. However, the indirect light is not limited to the light mentioned above.

Aspects of non-limiting embodiments of the present disclosure relate to providing an optical detection device that is capable of detecting a decrease in the accuracy of object detection caused by reception of indirect light at a light receiver.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an optical detection device including a light emitter that irradiates an area of interest; a light receiver that receives reflected light that has been emitted by the light emitter and reflected on a detection object, the light receiver including a plurality of light-receiving elements divided into a plurality of light reception sections; and a processor configured to perform at least one of full irradiation for irradiating the whole area of interest and full light reception for outputting all light reception results and at least one of partial irradiation for irradiating part of the area of interest and partial light reception for sequentially outputting part of the light reception results one part by one part and perform an object detection process for detecting the detection object in accordance with light received by the light receiver. The processor is configured to, based on a difference between an amount of received light received at each of the light reception sections at a time when the light emitter performs the full irradiation and an amount of received light received at each of the light reception sections at a time when the light emitter performs the partial irradiation, perform an indirect light detection process for detecting that at least one of the plurality of light reception sections receives indirect light when the light emitter performs the full irradiation.

BRIEF DESCRIPTION OF THE DRAWINGS

Exemplary embodiments of the present disclosure will be described in detail based on the following figures, wherein:

FIG. 17 is a flowchart illustrating a process performed by an optical detection device according to an exemplary embodiment.

DETAILED DESCRIPTION

Exemplary Embodiments

Figure 1:
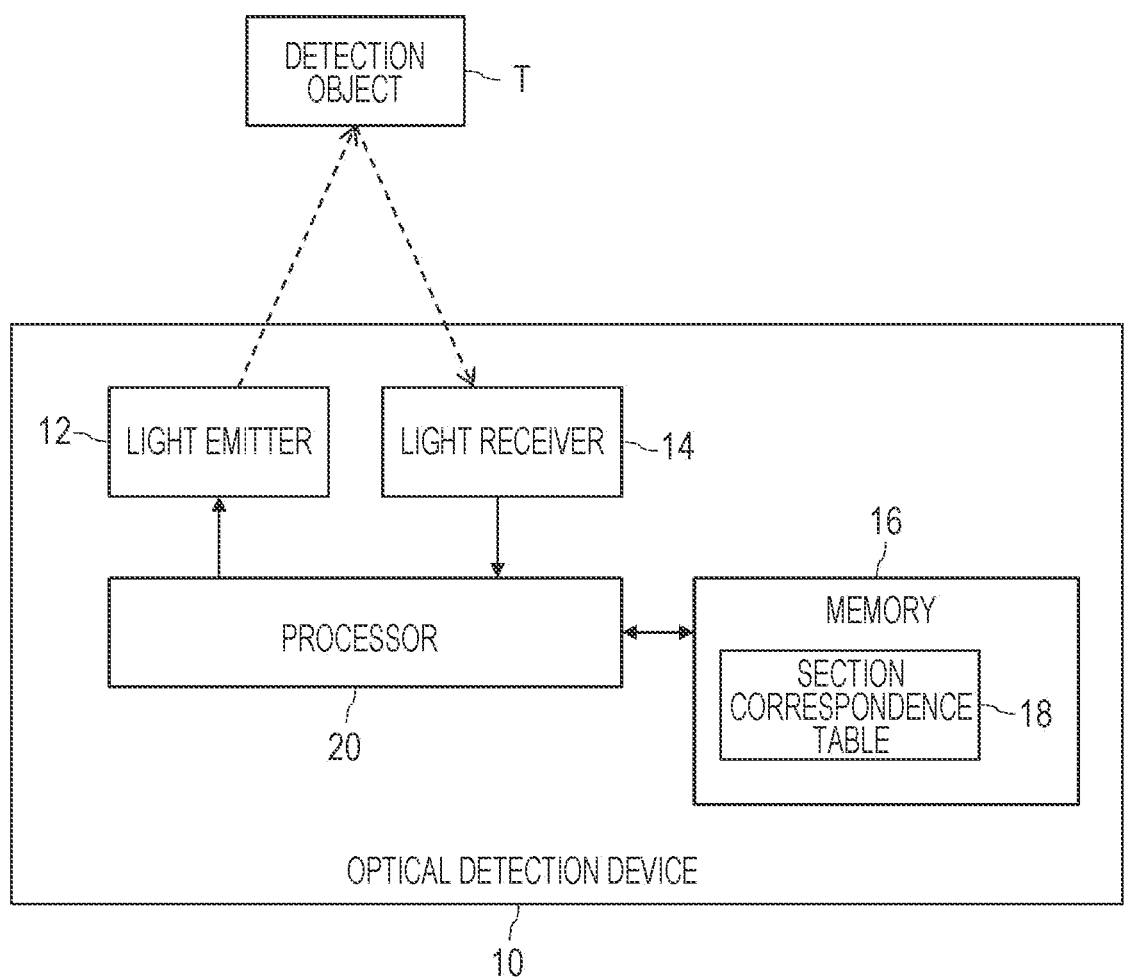
FIG. 1 is a schematic diagram of a configuration of an optical detection device according to an exemplary embodiment.

FIG. 1 is a schematic diagram illustrating a configuration of an optical detection device 10 according to an exemplary embodiment. The optical detection device 10 is a device that performs, by irradiating a detection object T with light, detection of whether or not the detection object T is present and measurement of the distance to the detection object T, in accordance with reflected light reflected from the detection object T and the like. As described above, the optical detection device 10 is capable of detecting the detection object T and measuring the distance to the detection object T. Thus, the detection object T as a target to which the distance is to be measured may be referred to as a measurement object. In addition, in the case where the optical detection device 10 measures the distance to the measurement object, the optical detection device 10 may be referred to as an optical distance measurement device. The concept of the detection object T includes a measurement object, and the concept of the optical detection device 10 includes an optical distance measurement device.

As a method for detecting the detection object T and measuring the distance to the detection object T, Time of Flight (ToF) is known. ToF is a method in which the time taken from the time at which light is emitted from the optical detection device 10 to the time at which the emitted light that is reflected on the detection object T is received at the optical detection device 10 is measured and detection of the detection object T and measurement of the distance to the detection object T are performed in accordance with the measured time.

ToF includes a direct method and a phase difference method (also called an indirect method). In the direct method, pulsed light that emits light for only a short period of time is applied to the detection object T and the time until the beam returns is measured. Measurement of distance is related to time. Thus, if noise of unintentional light such as indirect light is incident, the noise is unable to be removed by simply subtracting the amount of light corresponding to the noise. In the phase difference method, a time delay between periodically flashing pulsed light rays traveling to and from the detection object T is detected as a phase difference. The optical detection device 10 according to this exemplary embodiment employs the time difference method.

The optical detection device 10 may be a portable terminal or the like. However, the optical detection device 10 is not necessarily a portable terminal. In the case where the optical detection device 10 is a portable terminal, the optical detection device 10 may be used for face authentication of a user who wants to access the optical detection device 10. That is, when receiving an access request from a user, the optical detection device 10 may acquire a three-dimensional image of the face of the user as the detection object T and identify whether or not the user is allowed to access the optical detection device 10. Only when the user is identified as being allowed to access the optical detection device 10, the optical detection device 10 is able to permit the user to use the optical detection device 10. Furthermore, the optical detection device 10 may also be used for continuously detecting the detection object T or measuring the distance to the detection object T, for example, with augmented reality (AR).

The optical detection device 10 includes a light emitter 12, a light receiver 14, a memory 16, and a processor 20.

Figure 2:
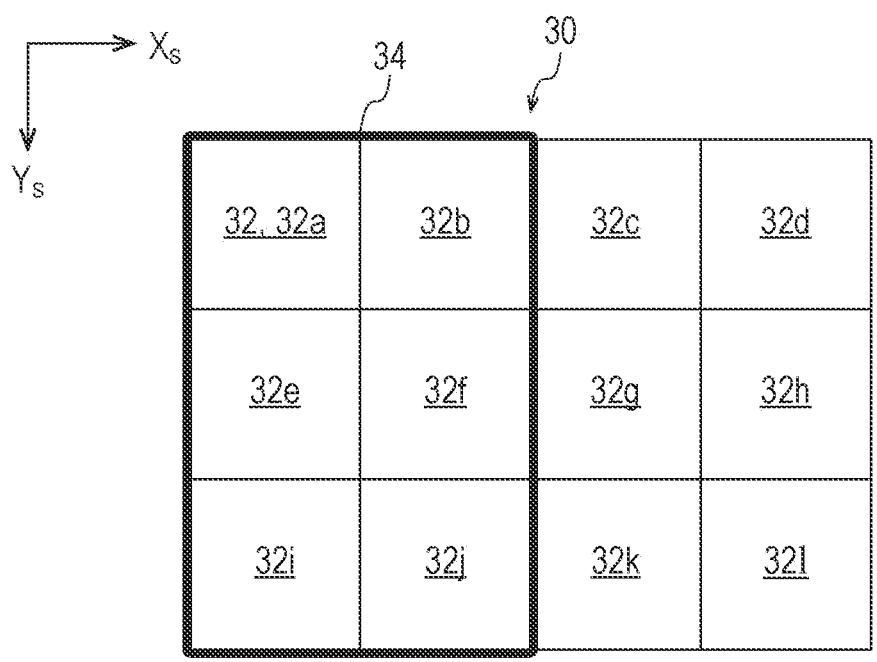
FIG. 2 is a diagram illustrating a plurality of irradiation sections defined as an irradiation region.

The light emitter 12 includes one or more light-emitting elements that emit light. The light emitter 12 is capable of emitting light to a predetermined irradiation region. FIG. 2 is a conceptual diagram illustrating an irradiation region 30 for the light emitter 12. The irradiation region 30 in this exemplary embodiment may be defined as a plane corresponding to the light emitter 12 and defined in the real space. In FIG. 2, a rectangle divided into a plurality of squares is illustrated. A region inside the outer sides of the rectangle corresponds to the irradiation region 30. In this exemplary embodiment, the irradiation region 30 is divided into a plurality of irradiation sections 32a to 32l. In this exemplary embodiment, each of the irradiation sections 32 is a square, and the irradiation sections 32a to 32l are defined to be arranged in two-dimensional directions, that is, an $X_S$-axis direction, which is a horizontal direction, and a $Y_S$-axis direction, which is a vertical direction. The irradiation region 30 is not necessarily defined as a plane defined in the space. The irradiation region 30 may be applied to a configuration in which the inside of a human being or an object is irradiated with light. Furthermore, the plane of the irradiation region 30 is not necessarily a plane similar to the plane of the light emitter.

In the irradiation region 30, an area of interest 34 is set. The area of interest 34 is an area for which detection of whether or not the area is affected by indirect light is performed in detection of the detection object T or measurement of the distance to the detection object T by the optical detection device 10. The area of interest 34 may be set appropriately by a user of the optical detection device 10. The area of interest 34 may be part of the irradiation region 30 or the whole irradiation region 30. The area of interest 34 includes a plurality of irradiation sections 32. In the example illustrated in FIG. 2, the area of interest 34 includes the irradiation sections 32a, 32b, 32e, 32f, 32i, and 32j.

Figure 3:
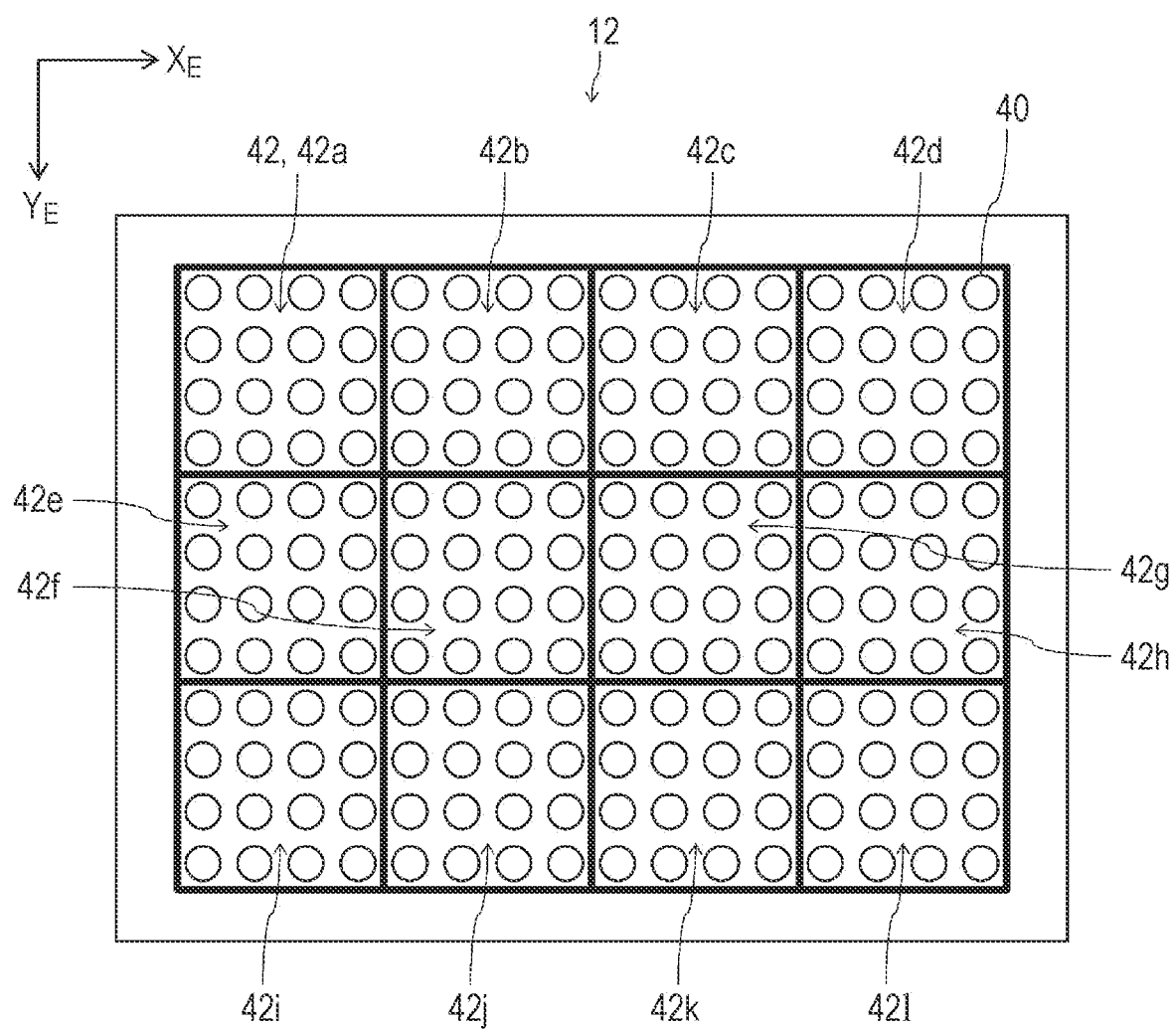
FIG. 3 is a plan view of a light emitter.

FIG. 3 is a plan view of the light emitter 12 in this exemplary embodiment. The light emitter 12 is configure to be capable of performing full irradiation for irradiating the entire area of interest 34 and partial irradiation for irradiating part of the area of interest 34. In this exemplary embodiment, as illustrated in FIG. 3, the light emitter 12 includes a plurality of light-emitting elements 40. The light-emitting elements 40 emit light. In this exemplary embodiment, the light-emitting elements 40 are capable of emitting pulsed light (in particular, periodic pulsed light). The light-emitting elements 40 are, for example, vertical cavity surface emitting lasers (VCSELs). The plurality of light-emitting elements 40 are arranged in two-dimensional directions, that is, an $X_E$-axis direction and a $Y_E$-axis direction, which is orthogonal to the $X_E$-axis direction. That is, the light emitter 12 is a surface light source.

The plurality of light-emitting elements 40 of the light emitter 12 are divided into a plurality of light emission sections 42. In the example illustrated in FIG. 3, a light emission section 42 includes sixteen (4 by 4) light-emitting elements 40. However, this configuration is simply an example. The number of light-emitting elements 40 included in a light emission section 42 is not limited to sixteen. In this exemplary embodiment, the plurality of light emission sections 42 are arranged in the two-dimensional directions, that is, the $X_E$-axis direction and the $Y_E$-axis direction.

The light-emitting elements 40 are capable of individually emitting light under the control of the processor 20. A specific circuit configuration for making the light-emitting elements 40 capable of individually emitting light may be well known. Thus, detailed explanation for the specific circuit configuration will be omitted. The light-emitting elements 40 being capable of individually emitting light means the light emission sections 42 being capable of individually emitting light.

The light emission sections 42 correspond to the irradiation sections 32 (see FIG. 2). In the case where a light-emitting element 40 included in a light emission section 42 emits light (hereinafter, for convenience, described as "a light emission section 42 emits light" or the like), the light emitted from the light emission section 42 is applied to a corresponding irradiation section 32. In this exemplary embodiment, light emission sections 42*a* to 42*l* corresponds to the irradiation sections 32*a* to 32*l*. For example, light emitted from the light emission section 42*a* is applied to the irradiation section 32, and light emitted from the light emission section 42*b* is applied to the irradiation section 32*b*. Full irradiation for irradiating the entire area of interest 34 is achieved by causing the light emission sections 42 corresponding to all the irradiation sections 32 included in the area of interest 34 to emit light. Partial irradiation for irradiating part of the area of interest 34 is achieved by causing only light emission sections 42 corresponding to part of the irradiation sections 32 included in the area of interest 34 to emit light.

As described above, in this exemplary embodiment, the light emitter 12 includes the plurality of light emission sections 42 corresponding to the plurality of irradiation sections 32, and the light emitter 12 is capable of performing full irradiation and partial irradiation by causing the light emission sections 42 to be capable of individually emitting light. However, a plurality of light emitters 12 that are not divided into a plurality of light emission sections 42 may be provided so that the light emitters 12 correspond to the irradiation sections 32 (that is, light emitted from the light emitters 12 are applied to the corresponding irradiation sections 32). Obviously, also in this case, the light emitters 12 are controlled to be capable of individually emitting light so that partial irradiation is performed.

Figure 4:
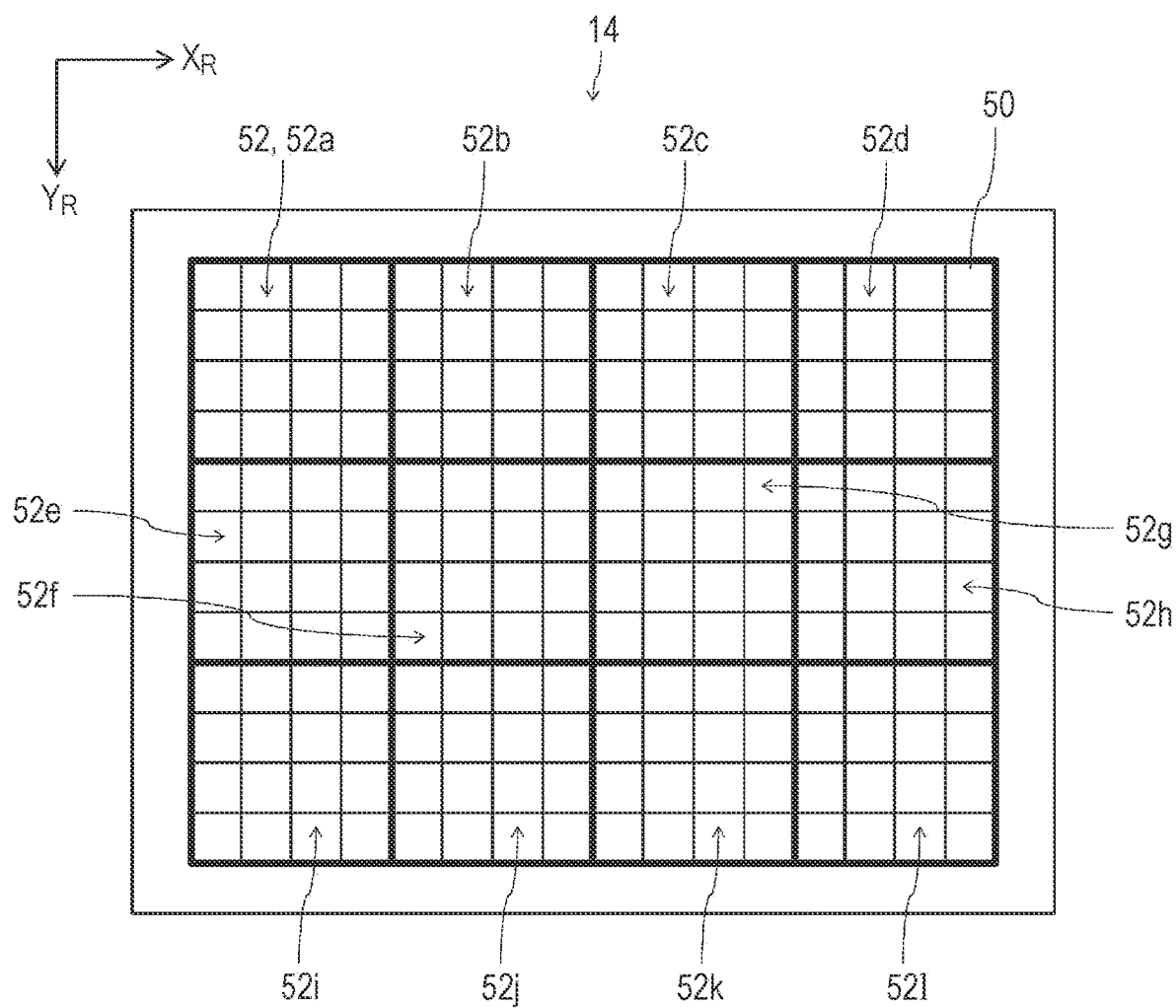
FIG. 4 is a plan view of a light receiver.

The light receiver 14 receives reflected light that has been emitted from the light emitter 12 and reflected on the detection object T and the like. In particular, in this exemplary embodiment, because the light emitter 12 emits periodic pulsed light, the light receiver 14 receives pulsed light as reflected light. FIG. 4 is a plan view of the light receiver 14 in this exemplary embodiment. The light receiver 14 includes a plurality of light-receiving elements 50. The light-receiving elements 50 are elements that detect intensity of light and convert the intensity of light (amount of received light) into electric signals. The light-receiving elements 50 are, for example, photodiodes. That is, the light receiver 14 may be a charge coupled device (CCD) sensor or the like. In this exemplary embodiment, the plurality of light-receiving elements 50 are arranged in two-dimensional directions, that is, an $X_R$-axis direction and a $Y_R$-axis direction, which is orthogonal to the $X_R$-axis direction.

The plurality of light-receiving elements 50 of the light receiver 14 are divided into a plurality of light reception sections 52. In the example illustrated in FIG. 4, a light reception section 52 includes sixteen (4 by 4) light-receiving elements 50. However, this configuration is simply an example. The number of light-receiving elements 50 included in a light reception section 52 is not limited to sixteen. The plurality of light reception sections 52 are arranged in the two-dimensional directions, that is, the $X_R$-axis direction and the $Y_R$-axis direction.

The light reception sections 52 correspond to the irradiation sections 32 (see FIG. 2). In this exemplary embodiment, because the irradiation sections 32 correspond to the light emission sections 42, the light reception sections 52 also correspond to the light emission sections 42. The light reception sections 52 receive reflected light that has been emitted from the light emitter 12 toward the corresponding irradiation sections 32 and reflected on the detection object T. In this exemplary embodiment, the light reception sections 52*a* to 52*l* correspond to the irradiation sections 32*a* to 32*l*. Furthermore, the light reception sections 52*a* to 52*l* correspond to the light emission sections 42*a* to 42*l*. Thus, for example, reflected light that has been emitted from the light emission section 42*a*, applied to the irradiation section 32*a*, and reflected on the detection object T and the like is received at the light reception section 52*a*, and reflected light that has been emitted from the light emission section 42*b*, applied to the irradiation section 32*b*, and reflected on the detection object T and the like is received by the light reception section 52*b*.

As described later, the light reception sections 52 may also receive indirect light. Indirect light includes reflected light that has been emitted from the light emitter 12, not applied to the detection object T through an assumed optical path, and reflected on the detection object T and the like and reflected light that has been reflected from the detection object T and the like and not received through an assumed optical path by the light receiver 14. The indirect light includes, for example, reflected light that has been emitted from the light emitter 12, reflected on an object different from the detection object T, applied to the detection object T, and reflected from the detection object T, reflected light that is multiple-reflected through lenses provided on a reflected light path from the detection object T to the light receiver 14 and then received by the light receiver 14, and the like.

Light applied to the detection object T through an assumed optical path includes not only light applied from the light emitter 12 directly to the detection object T but also light emitted from the light emitter 12, caused to be reflected on a mirror or the like intentionally by a user, and then applied to the detection object T. In a similar manner, reflected light received through an assumed optical path by the light receiver 14 includes not only reflected light received by the light receiver 14 directly from the detection object T but also reflected light reflected from the detection object T, caused to be reflected on a mirror or the like intentionally by a user, and then received by the light receiver 14. For example, in the case where there is an obstacle (for example, a wall or the like) between the optical detection device 10 and the detection object T, light emitted from the light emitter 12 or reflected light reflected from the detection object T is caused to be reflected on a mirror or the like intentionally by a user so that the traveling direction of the light is changed.

Indirect light is caused by light emitted from the light emitter 12 toward any one of the irradiation sections 32 (may be a plurality of irradiation sections 32). Hereinafter, an irradiation section 32 that has caused indirect light will be referred to as an "indirect light source irradiation section".

In this exemplary embodiment, not a light reception section 52 corresponding to an indirect light source irradiation section but a light reception section 52 adjacent to the light reception section 52 corresponding to the indirect light source irradiation section receives indirect light caused by light applied to the indirect light source irradiation section. For example, in the case where the irradiation section 32g (see FIG. 2) is an indirect light source irradiation section, a light reception section 52 adjacent to the light reception section 52g (see FIG. 4) corresponding to the irradiation section 32g, that is, the light reception section 52c, 52f, 52h, or 52k, receives indirect light caused by light applied to the irradiation section 32g, which is the indirect light source irradiation section. Hereinafter, a light reception section 52 that is adjacent to a light reception section 52 corresponding to an indirect light source irradiation section and receives indirect light will be referred to as an "indirect light reception section".

The light receiver 14 transmits a converted electric signal to the processor 20. The electric signal includes information indicating the amount of light received at each of the light reception sections 52. In particular, the electric signal includes information indicating the amount of pulsed light received at each of the light reception sections 52.

The memory 16 includes, for example, a hard disk drive (HDD), a solid state drive (SSD), an embedded multi media card (eMMC), a read only memory (ROM), or a random access memory (RAM). An optical detection program for operating units of the optical detection device 10 is stored in the memory 16. In the case where the optical detection device 10 is an optical distance measurement device that measures the distance to the detection object T, that is, a measurement object, a program stored in the memory 16 may be called an optical distance measurement program. For example, the optical detection program or the optical distance measurement program may be stored in a computer-readable non-transitory storage medium such as a universal serial bus (USB) memory or a compact disc-read only memory (CD-ROM). The optical detection device 10 is capable of reading the optical detection program or the optical distance measurement program from the storage medium mentioned above and executing the optical detection program or the optical distance measurement program.

Furthermore, as illustrated in FIG. 1, a section correspondence table 18 is stored in the memory 16. The section correspondence table 18 indicates correspondence between the irradiation sections 32 and the light emission sections 42 and correspondence between the irradiation sections 32 and the light reception sections 52. That is, the section correspondence table 18 is a table indicating correspondence between the light emission sections 42 and the light reception sections 52. The section correspondence table 18 is created in advance by an administrator of the optical detection device 10 or the like and stored in the memory 16.

Based on the assumption that the processor 20 controls the light emitter 12 to emit light, the processor 20 performs an object detection process for receiving an electric signal from the light receiver 14 that has received light emitted from the light emitter 12 and reflected on the detection object T and the like and detecting the detection object T in accordance with the received electric signal. The object detection process includes an object presence/absence detection process for detecting whether or not the detection object T is present, a distance measurement process for measuring the distance to the detection object T, and the like. The object presence/absence detection process is a process for detecting the amount of light reflected from an object. For example, a result of the object presence/absence detection process is able to be obtained only using a light intensity image. Thus, the object presence/absence detection process is used for, for example, a human sensor for detecting presence or absence of a person. In contrast, the distance measurement process detects the distance to an object using ToF or the like. In this case, a result of the distance measurement process is not able to be obtained using only a light intensity image, and a time element is required. In this exemplary embodiment, the processor 20 performs detection of the detection object T and measurement of the distance to the detection object T using ToF. Hereinafter, a process performed by the processor 20 may be described as an object presence/absence detection process or a distance measurement process in the case where, for example, a similar perspective is also applicable to an object presence/absence detection process.

In the case where the light emitter 12 performs full irradiation prior to the object presence/absence detection process or the distance measurement process, the processor 20 performs an indirect light detection process for detecting whether or not the light receiver 14 (more particularly, at least one of the plurality of light-receiving elements 50) receives indirect light. To achieve accurate distance measurement, by selecting the power of a light source, the pulse width, and the number of pulses such that a plurality of distance data based on different measurement conditions become data with optimal amounts of accumulated charge for each distance measurement area, a problem of a lack of sensitivity and saturation may be avoided. That is, a light intensity image may be acquired by detecting only the amount of received light prior to measuring distance. The number of pulses and the like are able to be changed relatively easily. Thus, prior to measuring distance, preliminary processes may be performed with different number of pulses. The amount of received light, that is, an intensity image, is acquired for each distance measurement position, so that the number of pulses that achieves an optimal amount of accumulated charge may be selected. In this exemplary embodiment, description will focus on a case where an intensity image is used for an indirect light detection process. However, an intensity image may be used for other processes such as a determination as to whether or not the output amount of accumulated charge is within expectation.

In the case where the light emitter 12 performs full irradiation, if the light receiver 14 receives indirect light, the amount of light received by the light receiver 14 increases by the amount of the indirect light, compared to the case where the light receiver 14 does not receive indirect light. For more details, in the case where the light emitter 12 performs full irradiation, if the light receiver 14 receives indirect light, the amount of light received by any one of the light reception sections 52 (this is an indirect light reception section and may be a plurality of light reception sections 52) increases, compared to the case where the light receiver 14 does not receive indirect light. The processor 20 performs an indirect light detection process on the basis of the characteristics described above. The details of the indirect light detection process will be described below.

Figure 5:
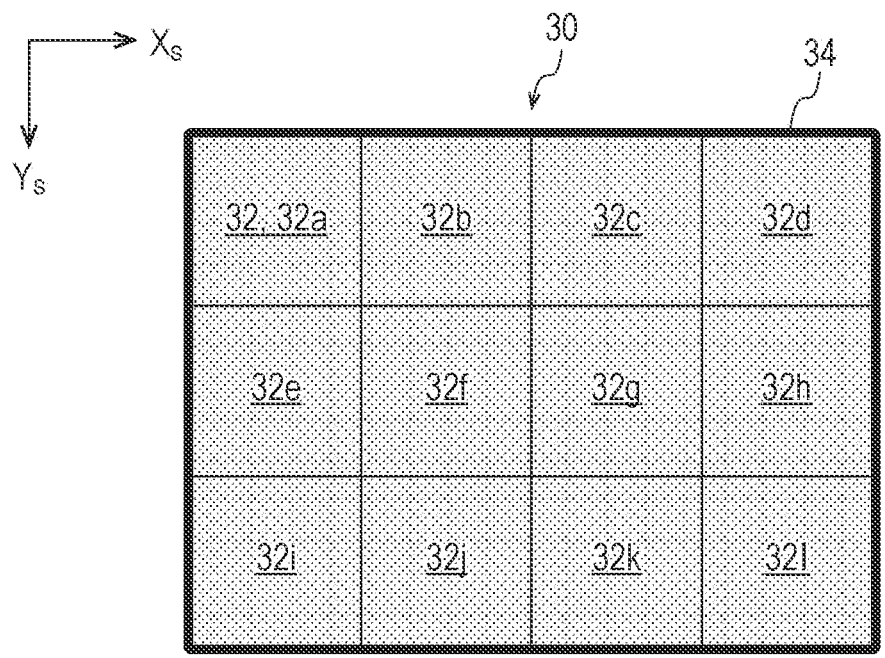
FIG. 5 is a diagram illustrating irradiation sections irradiated with light at the time of full irradiation.

First, the processor 20 controls the light emitter 12 to irradiate all the irradiation section 32 included in the area of interest 34. That is, the processor 20 controls the light emitter 12 to perform full irradiation. FIG. 5 is a diagram illustrating irradiation sections 32 irradiated with light at the time of full irradiation. In FIG. 5, shaded irradiation sections 32 represent irradiation sections 32 irradiated with light. The same applies to FIGS. 6 to 12. An example of the case where the whole irradiation region 30 is set as the area of interest 34 is illustrated in FIG. 5.

In the state in which the light emitter 12 performs full irradiation, each of the light-receiving elements 50 included in the light receiver 14 receives reflected light reflected from the detection object T and the like and transmits an electric signal indicating the amount of received reflected light to the processor 20. The processor 20 acquires information about the amount of light received by each of the light reception sections 52 at the time of full irradiation on the basis of the electric signal transmitted from the light-receiving element 50, and stores the information about the amount of received light into the memory 16. As described above, in this exemplary embodiment, the light emitter 12 (more particularly, each of the light-emitting elements 40) emits periodic pulsed light. Thus, the processor 20 accumulates, for each of the light reception sections 52, the amounts of pulsed light rays received by each of the light-receiving elements 50 in a chronological order. In this case, the processor 20 regards the accumulated value of the amounts of a predetermined number of received pulsed light rays as the amount of light received at each of the light reception sections 52.

Next, the processor 20 controls the light emitter 12 to irradiate part of the irradiation sections 32 included in the area of interest 34. That is, the processor 20 controls the light emitter 12 to perform partial irradiation. An example of the irradiation sections 32 irradiated with light at the time of partial irradiation is illustrated in FIG. 6.

Figure 6:
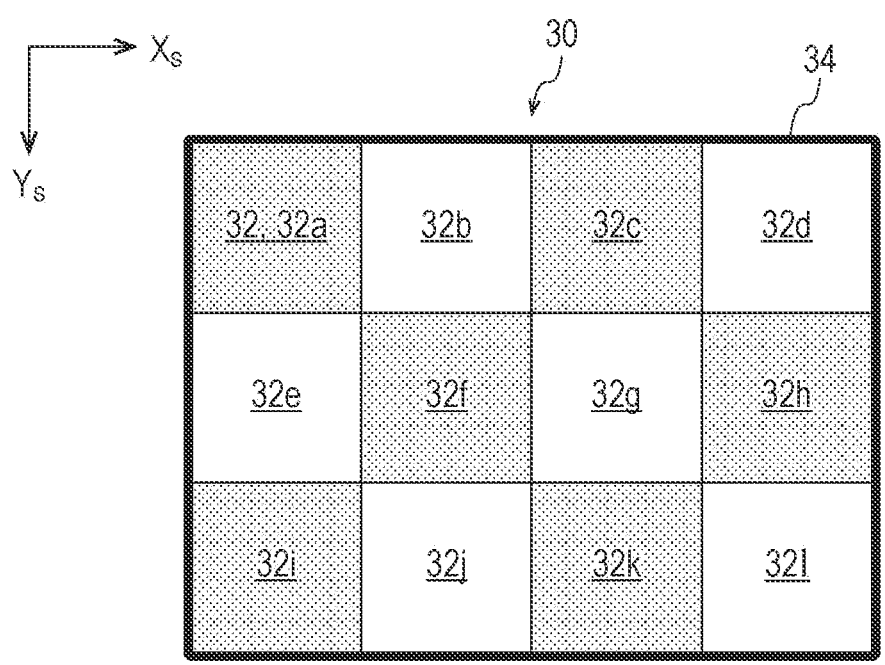
FIG. 6 is a first diagram illustrating an example of irradiation sections irradiated with light at the time of partial irradiation.

In the example illustrated in FIG. 6, the processor 20 controls the light emitter 12 such that irradiation sections 32 irradiated with light and irradiation sections 32 not irradiated with light are arranged alternately in an $X_S$-axis direction and a $Y_S$-axis direction. As described above, in this exemplary embodiment, the light emission sections 42a to 42l correspond to the irradiation sections 32a to 32l. Thus, as illustrated in FIG. 6, in the case where the irradiation sections 32a, 32c, 32f, 32h, 32i, and 32k are irradiated at the time of partial irradiation, the processor 20 causes the light emission sections 42a, 42c, 42f, 42h, 42i, and 42k to emit light.

In the state in which the light emitter 12 performs partial irradiation, each of the light-receiving elements 50 included in the light receiver 14 receives reflected light reflected from the detection object T and the like and transmits an electric signal indicating the amount of received reflected light to the processor 20. The processor 20 acquires information about the amount of light received by each of the light reception sections 52 at the time of partial irradiation on the basis of the electric signal transmitted from the light-receiving element 50, and stores the information about the amount of received light into the memory 16. At the time of partial irradiation, the processor 20 also accumulates, for each of the light reception sections 52, the amounts of pulsed light rays received by each of the light-receiving elements 50 in a chronological order, and regards the accumulated value of the amounts of a predetermined number of received pulsed light rays as the amount of light received at each of the light reception sections 52.

The processor 20 calculates, for each of the light reception sections 52, a difference between the amount of light received at the time of full irradiation and the amount of light received at the time of partial irradiation. In particular, the processor 20 calculates, for each of the light reception sections 52 corresponding to the irradiation sections 32 irradiated with light by partial irradiation, a difference between the amount of light received at the time of full irradiation and the amount of light received at the time of partial irradiation. Indirect light is caused by light emitted from the light emitter 12 toward an indirect light source irradiation section described above. Furthermore, the indirect light is often received at an indirect light reception section adjacent to a light reception section 52 corresponding to the indirect light source irradiation section. In the case where the light receiver 14 receives indirect light at the time of full irradiation, any one of the irradiation sections 32 within the area of interest 34 corresponds to an indirect light source irradiation section, and an indirect light reception section adjacent to a light reception section 52 corresponding to the indirect light source irradiation section receives the indirect light. In the case of partial irradiation, only part of the irradiation sections 32 within the area of interest 34 is irradiated with light. Thus, in the case of partial irradiation, if an indirect light source irradiation section is not irradiated with light, no indirect light is generated, and no indirect light reception section receives indirect light. That is, there is a difference in the amount of light received at an indirect light reception section between full irradiation and partial irradiation (for more details, the amount of light received at the time of full irradiation increases by the amount of indirect light).

Thus, in the case where there is a light reception section 52 in which the difference between the amount of light received at the time of full irradiation and the amount of light received at the time of partial irradiation is equal to or more than a threshold amount, the processor 20 is able to detect that the light receiver 14 receives indirect light at the time of full irradiation. In particular, the processor 20 is able to identify the corresponding light reception section 52 as an indirect light reception section. The threshold amount is set appropriately in accordance with the amount of indirect light that may be received by the light receiver 14.

A specific example will be described below. For example, the irradiation section 32g is an indirect light source irradiation section, and the light reception section 52f is an indirect light reception section. In the case where full irradiation is performed as illustrated in FIG. 5, the light reception section 52f, which is the indirect light reception section, receives, in addition to reflected light that has been applied to the irradiation section 32f and reflected from the detection object T and the like, indirect light caused by light applied to the indirect light source irradiation section. In contrast, in the case where partial irradiation is performed as illustrated in FIG. 6, the irradiation section 32g, which is the indirect light source irradiation section, is not irradiated with light. Thus, the light reception section 52f, which is the indirect light reception section, receives light that has been applied to the irradiation section 32f and reflected from the detection object T and the like but does not receive indirect light caused by light applied to an indirect light source irradiation section. Therefore, the difference between the amount of light received at the light reception section 52f at the time of full irradiation and the amount of light received at the light reception section 52f at the time of partial irradiation may be equal to or more than the threshold amount, and the processor 20 is able to detect that the light receiver 14 receives indirect light and the light reception section 52f is the indirect light reception section.

In the case where an indirect light source irradiation section is included in irradiation sections 32 irradiated with light by the first partial irradiation, the processor 20 is not able to detect, only by the first partial irradiation, that the light receiver 14 receives indirect light when the light emitter 12 performs full irradiation. Thus, in the case where there is no light reception section 52 in which the difference between the amount of light received at the time of full irradiation and the amount of light received at the first partial irradiation is equal to or more than the threshold amount, the processor 20 performs the second partial irradiation in which the irradiation sections 32 irradiated with light by the first partial irradiation are not irradiated with light and the irradiation sections 32 that are not irradiated with light by the first partial irradiation are irradiated with light.

Figure 7:
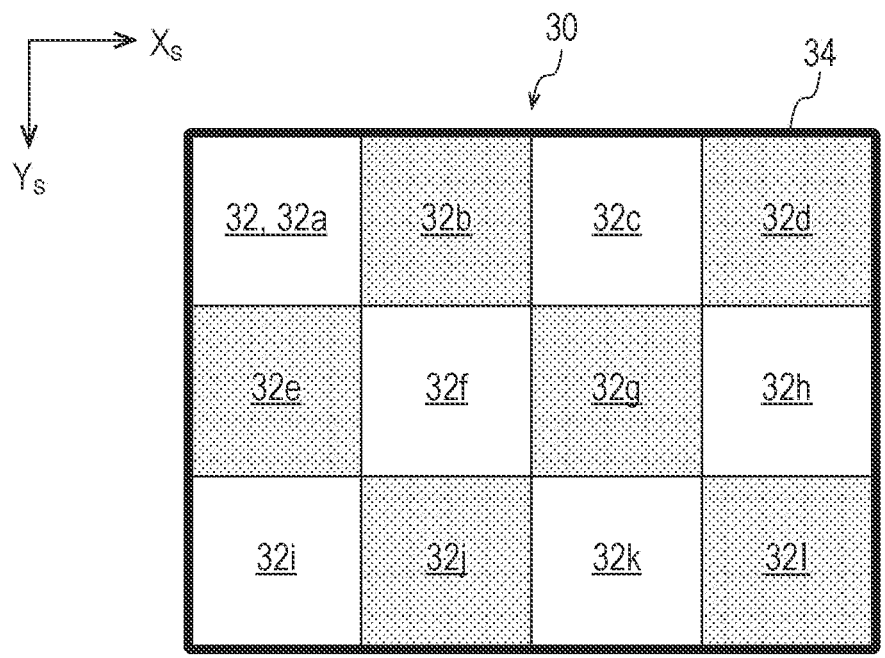
FIG. 7 is a second diagram illustrating an example of irradiation sections irradiated with light at the second partial irradiation.

FIG. 7 is a diagram illustrating an example of irradiation sections 32 irradiated with light at the second partial irradiation. In the example illustrated in FIG. 7, the processor 20 controls the light emitter 12 such that irradiation sections 32 irradiated with light and irradiation sections 32 not irradiated with light are arranged alternately in the $X_S$-axis direction and the $Y_S$-axis direction, as in the first partial irradiation. In the second partial irradiation in the example illustrated in FIG. 7, all the irradiation sections 32 that are not irradiated with light by the first partial irradiation are irradiated with light. That is, in the second partial irradiation, the irradiation sections 32b, 32d, 32e, 32g, 32j, and 32l are irradiated with light. Thus, the processor 20 causes the light emission sections 42b, 42d, 42e, 42g, 42j, and 42l to emit light.

In the second partial irradiation, as in the first partial irradiation, the processor 20 also acquires information about the amount of light received by each of the light reception sections 52 at the time of the second partial irradiation on the basis of an electric signal transmitted from each of the light-receiving elements 50, and stores the information about the amount of received light into the memory 16. In the second partial irradiation, the processor 20 also accumulates, for each of the light reception sections 52, the amounts of pulsed light rays received by each of the light-receiving elements 50 in a chronological order, and regards the accumulated value of the amounts of a predetermined number of received pulsed light rays as the amount of light received at each of the light reception sections 52.

Then, the processor 20 detects that the light receiver 14 receives indirect light and detects an indirect light reception section by calculating, for each of the light reception sections 52, the difference between the amount of light received at the time of full irradiation and the amount of light received at the time of partial irradiation, as in the first partial irradiation.

In this exemplary embodiment, by two partial irradiations, all the irradiation sections 32 within the area of interest 34 are irradiated with light. Thus, according to this exemplary embodiment, the processor 20 is able to detect that the light receiver 14 receives indirect light and detects an indirect light reception section by performing the two partial irradiations. In this exemplary embodiment, in the case where, for all the light reception sections 52, both the difference between the amount of light received at the time of full irradiation and the amount of light received at the first partial irradiation and the difference between the amount of light received at the time of full irradiation and the amount of light received at the second partial irradiation are less than the threshold amount, the processor 20 is able to identify that the light receiver 14 does not receive indirect light when the light emitter 12 performs full irradiation.

The number of times of partial irradiation is not necessarily two. All the irradiation sections 32 within the area of interest 34 only need to be irradiated by a plurality of times of partial irradiation. However, to shorten the processing time for the indirect light detection process, it is desirable that the number of times of partial irradiation be as small as possible. In the case where the irradiation sections 32 are arranged in the two-dimensional directions, that is, the $X_S$-axis direction and the $Y_S$-axis direction, it is desirable that, as in this exemplary embodiment, irradiation sections 32 irradiated with light and irradiation sections 32 not irradiated with light in a single partial irradiation be arranged alternately in the $X_S$-axis direction and the $Y_S$-axis direction. Thus, the indirect light detection process is able to be performed by the two partial irradiations.

The processor 20 may make the amount of power consumed by a single light-emitting element 40 per unit time for full irradiation be smaller than that for partial irradiation. Thus, the load of the processor 20 for causing the light emitter 12 to emit light (for example, a driver for driving the light-emitting elements 40) may be reduced. In this case, since the amount of light emission is small at the time of full irradiation, the amount of light received at the time of full irradiation is compared with the amount of light received at the time of partial irradiation by taking into consideration the decrease in the amount of light emission at the time of full irradiation. For example, in the case where the amount of light received at the time of full irradiation is half the amount of light received at the time of partial irradiation (the amount of received light does not necessarily become half simply when power is reduced to half), the amount of light received at the full irradiation is doubled and then compared with the amount of light received at the time of partial irradiation.

By performing the indirect light detection process described above, the processor 20 is able to detect that the light receiver 14 receives indirect light in the case where the light emitter 12 performs full irradiation. Furthermore, by performing an indirect light source irradiation section identifying process described below, the processor 20 is able to identify an indirect light source irradiation section.

As described above, by the indirect light detection process, an indirect light reception section is able to be identified. An indirect light reception section is a light reception section 52 that is adjacent to a light reception section 52 corresponding to an indirect light source irradiation section. A case where an indirect light source irradiation section is identified from among irradiation sections 32 adjacent to an irradiation section 32 adjacent to an indirect light reception section will be described. The processor 20 identifies, based on the amount of light received at an indirect light reception section when an irradiation section 32 (hereinafter, referred to as an "adjacent irradiation section") that is adjacent to an irradiation section 32 corresponding to an indirect light reception section is irradiated with light, an indirect light source irradiation section, which is an irradiation section 32 related to light that causes indirect light received by the indirect light reception section.

A specific example will be described below. For example, by the indirect light detection process, the light reception section 52f is identified as an indirect light reception section. In this case, an irradiation section 32 corresponding to the indirect light reception section is the irradiation section 32f (see FIG. 2). Thus, the irradiation sections 32b, 32e, 32g, and 32j are defined as adjacent irradiation sections.

Figure 8:
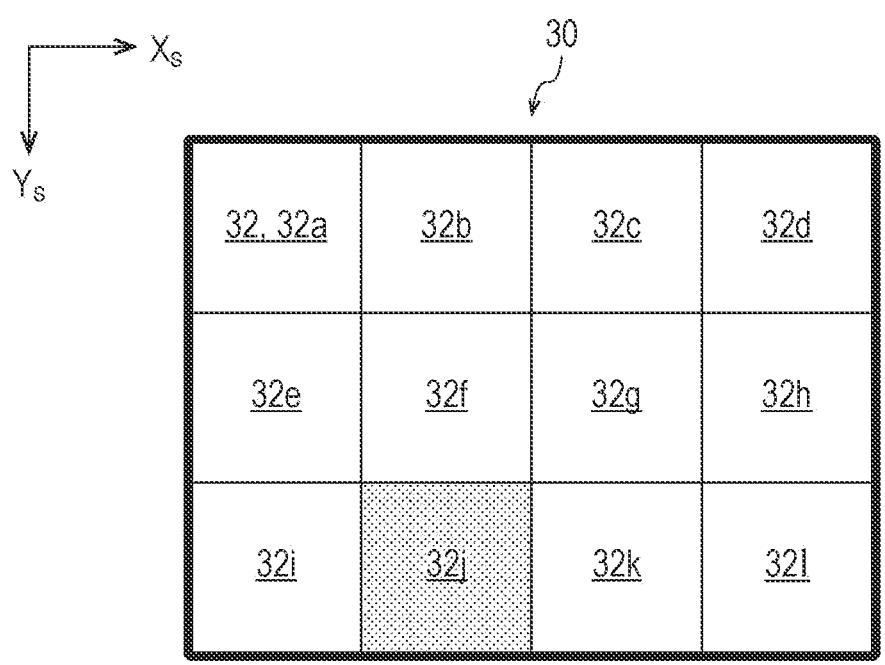
FIG. 8 is a first diagram illustrating a state in which an adjacent irradiation section is irradiated with light.

The processor 20 controls the light emitter 12 to irradiate only one of the adjacent irradiation sections. In this case, as illustrated in FIG. 8, the processor 20 first controls the light emitter 12 to irradiate the irradiation section 32j, which is an adjacent irradiation section, with light. Specifically, the processor 20 causes the light emission section 42j to emit light. Then, the processor 20 acquires information about the amount of light received by the light reception section 52f, which is the indirect light reception section, and stores the acquired information about the amount of received light into the memory 16.

Figure 9:
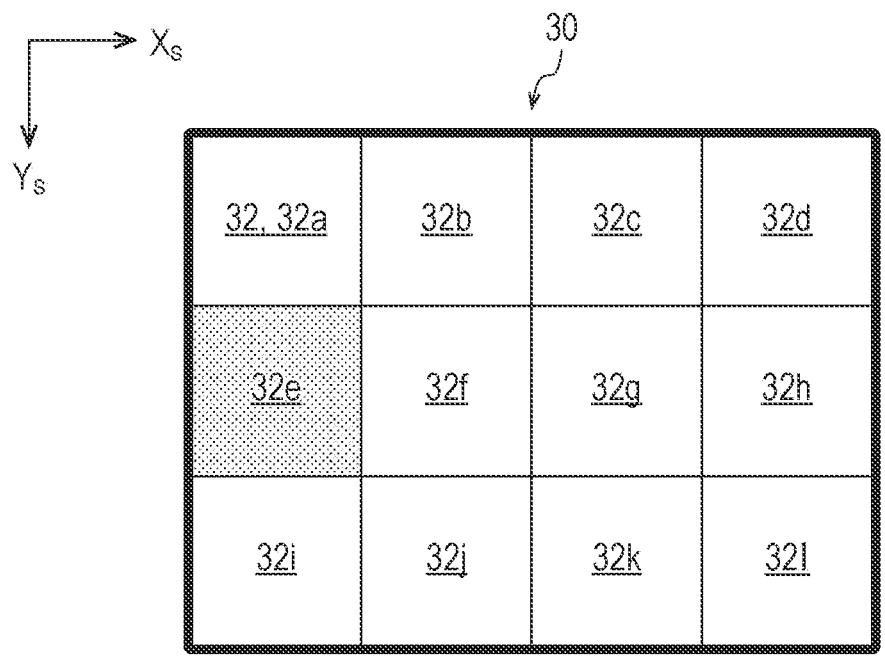
FIG. 9 is a second diagram illustrating a state in which an adjacent irradiation section is irradiated with light.
Figure 10:
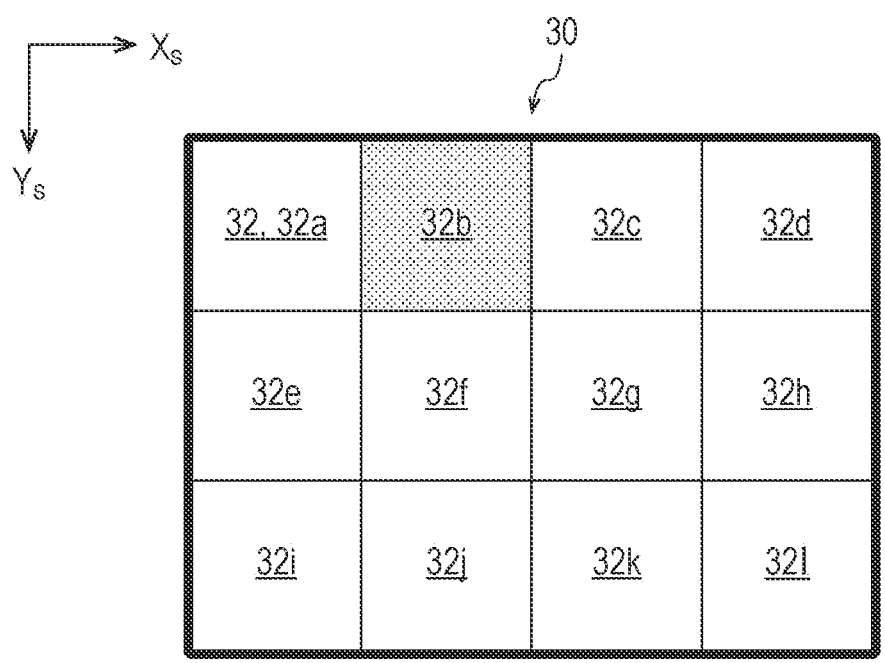
FIG. 10 is a third diagram illustrating a state in which an adjacent irradiation section is irradiated with light.
Figure 11:
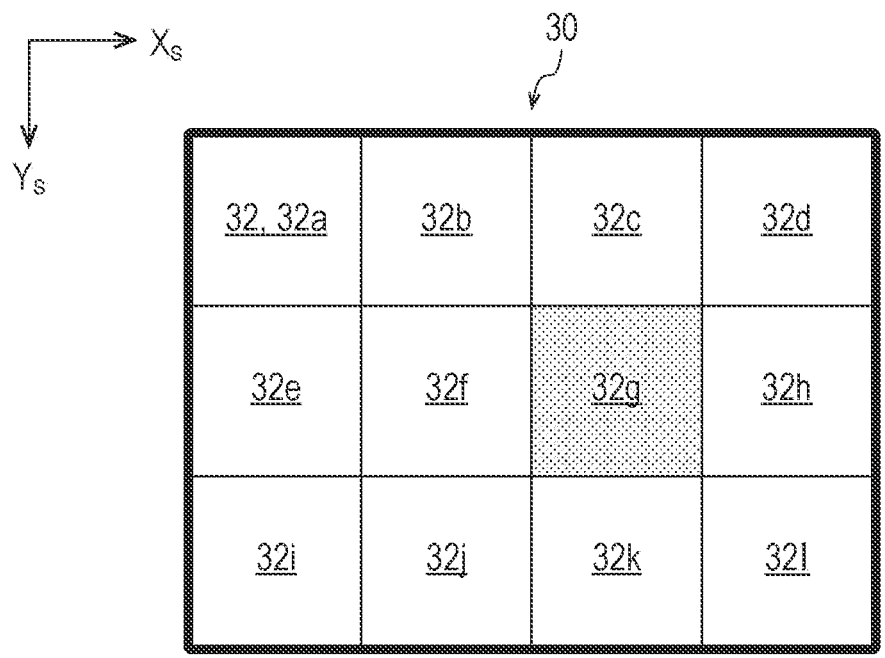
FIG. 11 is a fourth diagram illustrating a state in which an adjacent irradiation section is irradiated with light.

In a similar manner, as illustrated in FIGS. 9 to 11, the processor 20 controls the light emitter 12 to irradiate the irradiation sections 32e, 32b, and 32g, which are adjacent irradiation sections, with light. The processor 20 acquires information about the amount of light received at the light reception section 52f, which is the indirect light reception section, at the time when each of the adjacent irradiation sections is irradiated with light, and stores the acquired information about the amount of received light into the memory 16.

In the case where light is applied from an adjacent irradiation section to an indirect light source irradiation section, an indirect light reception section receives indirect light. In contrast, in the case where light is applied only to an adjacent irradiation section that is not an indirect light source irradiation section, the indirect light reception section does not receive indirect light. Thus, the processor 20 compares a plurality of amounts of received light received by the indirect light reception section at the time when the adjacent irradiation sections are irradiated with light, and identifies an adjacent irradiation section corresponding to the amount of received light larger than the other amounts of received light as an indirect light source irradiation section.

Figure 12:
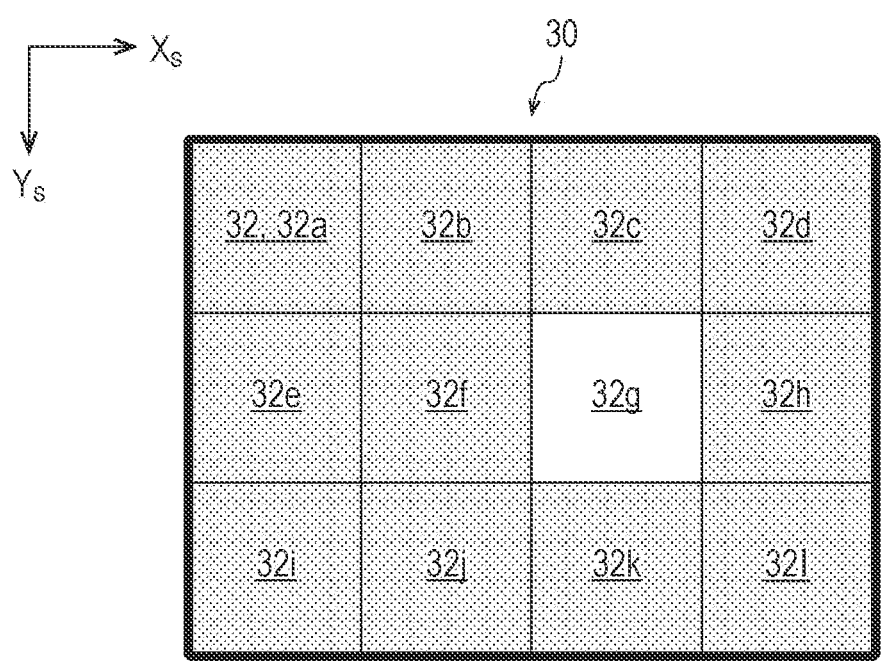
FIG. 12 is a diagram illustrating a state in which irradiation sections different from an indirect light source irradiation section are irradiated with light.

After performing the indirect light detection process and the indirect light source irradiation section identifying process described above, the processor 20 performs an object presence/absence detection process or a distance measurement process. In the object presence/absence detection process or the distance measurement process, to reduce the influence of indirect light, the processor 20 may control the light emitter 12 such that the amount of irradiation with light on the identified indirect light source irradiation section is smaller than the amounts of irradiation with light on the other irradiation sections 32. FIG. 12 illustrates, for example, a state in which the irradiation section 32g, which is an indirect light source irradiation section, is not irradiated with light and the other irradiation sections 32 are irradiated with light. The processor 20 controls the light emitter 12 to apply light as illustrated in FIG. 12, and performs an object presence/absence detection process or a distance measurement process. In particular in the case of the distance measurement process, if indirect light is measured as irradiation from a corresponding irradiation section without detection of the indirect light, due to different optical paths, a difference in light reception time occurs and an accurate distance is unable to be calculated.

In the object presence/absence detection process or the distance measurement process, the processor 20 also accumulates the amounts of pulsed light rays received by each of the light-receiving elements 50 in a chronological order, detects the detection object T on the basis of the accumulated amount of light received by the light-receiving element 50, and calculates the distance to the detection object T. In the indirect light detection process and the indirect light source irradiation section identifying process, the amount of light received at each of the light reception sections 52 may be smaller than that in the object presence/absence detection process or the distance measurement process. Thus, to achieve a faster indirect light detection process or indirect light source irradiation section identifying process, the processor 20 may reduce the number of times of accumulation for reflected light of a plurality of pulsed light rays in the indirect light detection process or the indirect light source irradiation section identifying process compared to the number of times of accumulation for reflected light of a plurality of pulsed light rays in the object presence/absence detection process or the distance measurement process.

In the case where the optical detection device 10 performs an object presence/absence detection process or a distance measurement process while photographing moving images, the optical detection device 10 may perform an indirect light detection process and an indirect light source irradiation section identifying process per frame image forming a moving image (for example, 30 images per second with a frame rate of 30 frame per second (fps)) and then perform the object presence/absence detection process or the distance measurement process.

Figure 13:
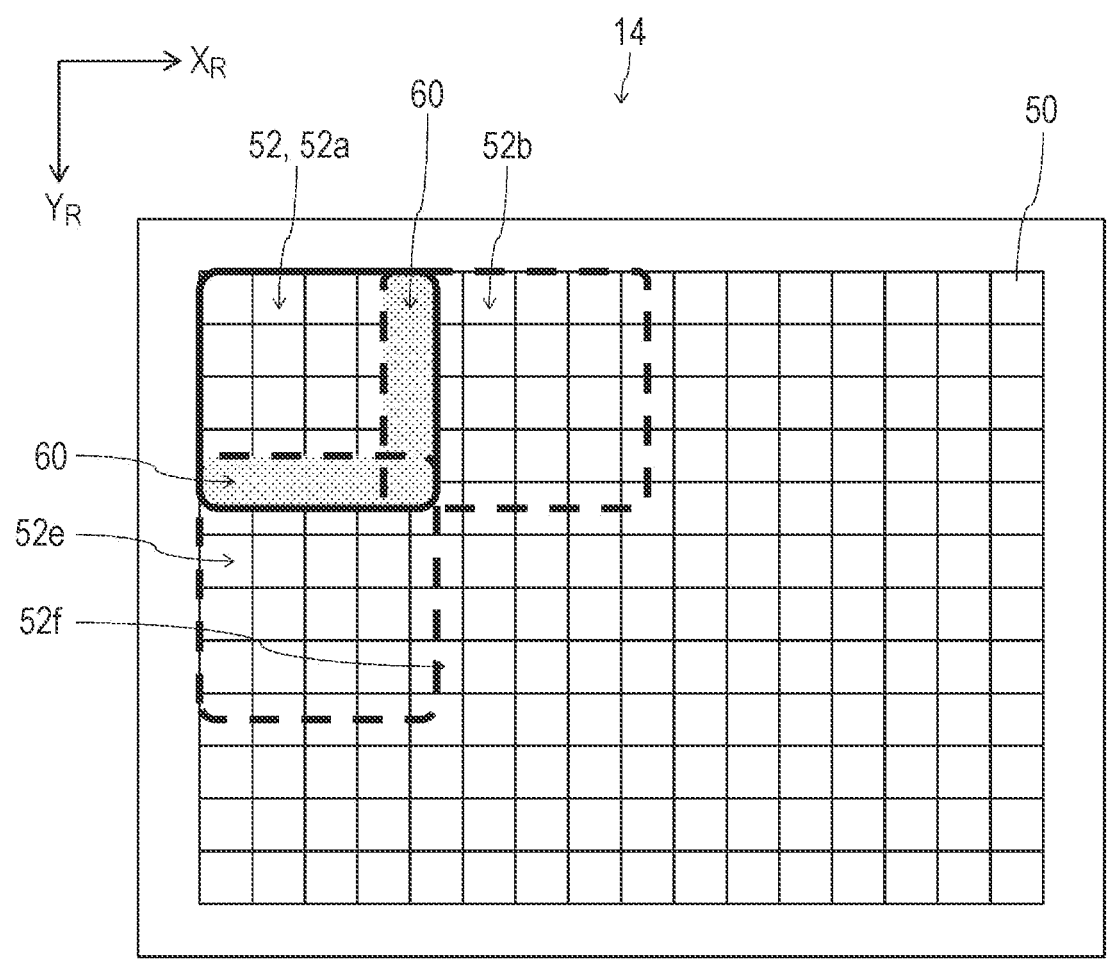
FIG. 13 is a diagram illustrating overlap regions.

FIG. 13 is a diagram illustrating overlap regions 60. A case where, as a result of a specific design of a lens or as a result that light emitted from the light emitter 12 and light reflected on the detection object T and the like travel while spreading out, an edge part of each of the light reception sections 52 includes an overlap region 60 that overlaps with an edge part of an adjacent light reception section 52, is illustrated in FIG. 13. Although each of the irradiation sections 32 includes an overlap region 60, overlap regions 60 of the light reception sections 52 will be focused on here. Hereinafter, a process regarding an overlap region 60 will be described by focusing on the overlap region 60 between the light reception section 52a and the light reception section 52b illustrated in FIG. 13. However, the process described below is also applied to overlap regions 60 between other light reception sections 52.

Figure 14:
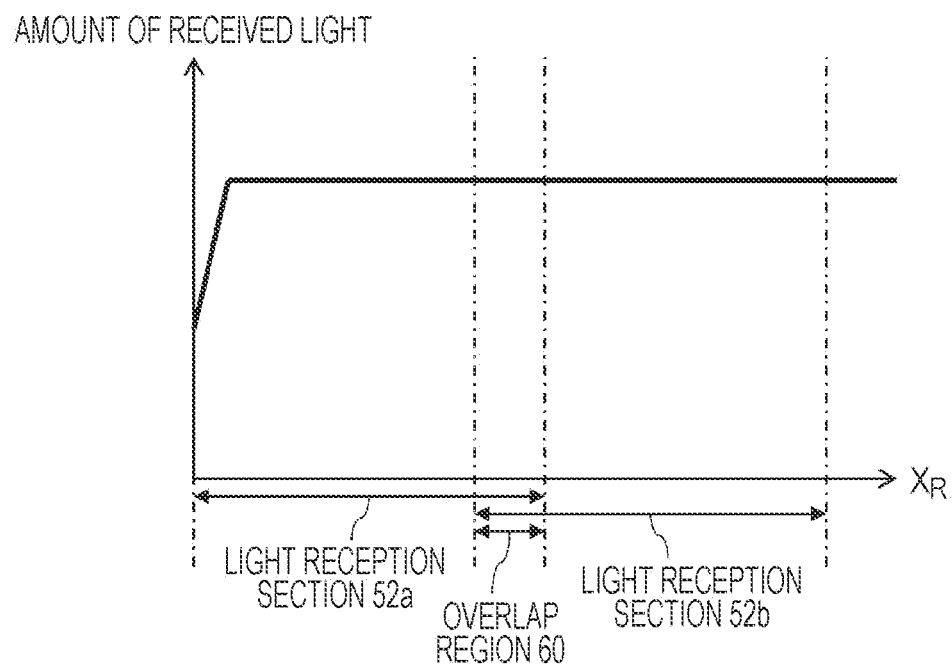
FIG. 14 is a diagram illustrating the amount of light received in an overlap region at the time of full irradiation.
Figure 15:
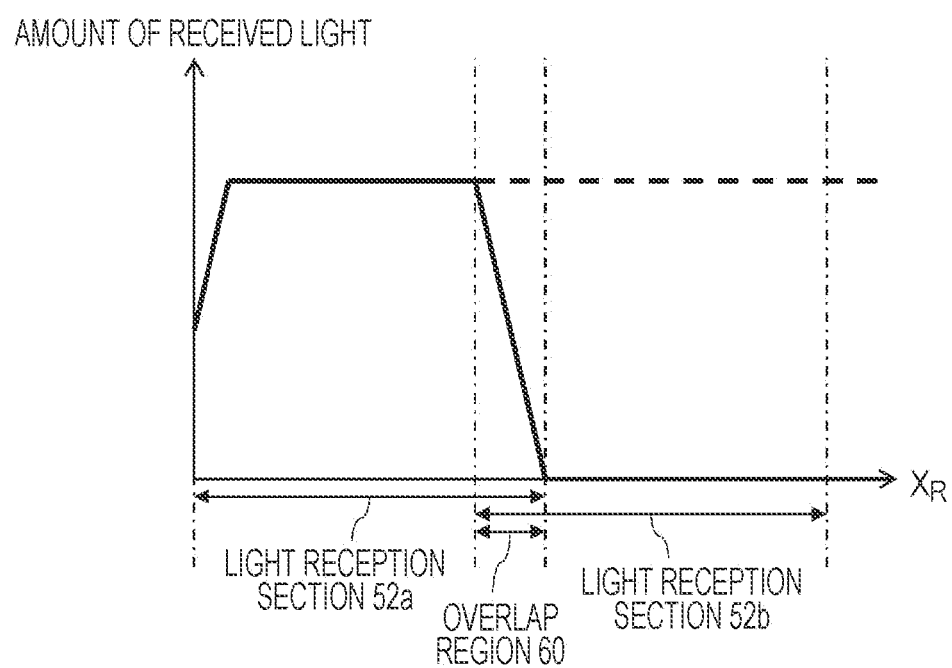
FIG. 15 is a diagram illustrating the amount of light received in an overlap region at the time of partial irradiation.

FIG. 14 is a graph illustrating the amount of light received at the light reception sections 52a and 52b at the time of full irradiation. FIG. 15 is a graph illustrating the amount of light received at the light reception sections 52a and 52b at the time of partial irradiation in which the irradiation section 32a corresponding to the light reception section 52a is irradiated with light and the irradiation section 32b corresponding to the light reception section 52b is not irradiated with light. In FIGS. 14 and 15 (also in FIG. 16), the horizontal axis represents a position in the $X_R$-axis direction, and the vertical axis represents the amount of light received by each of the light-receiving elements 50 included in the light reception sections 52. It is desirable that the amount of received light be measured in a state in which a light reception section is confirmed as not being an indirect light reception section, such as at the time of shipping. The light reception section 52a is confirmed as not being an indirect light reception section.

As illustrated in FIG. 15, in the case where the irradiation section 32a is irradiated with light and the irradiation section 32b is not irradiated with light, the amount of light received in the overlap region 60 in the light reception section 52a that overlaps with the light reception section 52b gradually decreases as closer to an edge of the light reception section 52a. Thus, a difference in the amount of light received at the light reception section 52a between the time of full irradiation illustrated in FIG. 14 and the time of partial irradiation illustrated in FIG. 15 occurs. This difference may cause a false determination that the light reception section 52a is an indirect light reception section.

Thus, to prevent occurrence of a false determination, the processor 20 preferably corrects the amount of light received in the overlap region 60 at the time of partial irradiation and then performs the indirect light detection process. Specifically, at the time of partial irradiation, the processor 20 corrects the amount of light received in the overlap region 60 overlapping with the light reception section 52 (in the example of FIG. 15, the light reception section 52b) corresponding to the irradiation section 32 not irradiated with light, of the amount of light received at the light reception section 52 (in the example of FIG. 15, the light reception section 52a) corresponding to the irradiation section 32 irradiated with light, on the basis of the amount of light received in the overlap region 60 at the time of full irradiation. For more details, the processor 20 corrects the amount of light received in the overlap region 60 at the time of partial irradiation to be equal to the amount of light received in the overlap region 60 at the time of full irradiation, by using the rate of the amount of light received in the overlap region 60 at the time of full irradiation (indicated by a broken line) to the amount of light received in the overlap region 60 at the time of partial irradiation.

Figure 16:
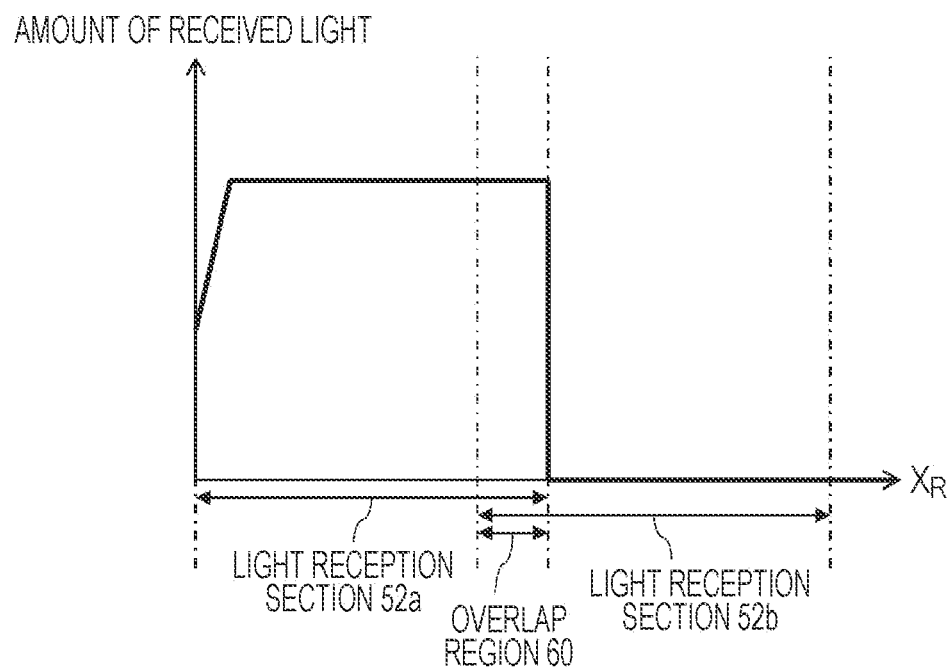
FIG. 16 is a diagram illustrating the corrected amount of light received in the overlap region.

FIG. 16 is a diagram illustrating the corrected amount of light received in the overlap region 60. The corrected amount of light received in the overlap region 60 is equal to the amount of light received at the time of full irradiation illustrated in FIG. 14. Thus, in the case where the light reception section 52a is not an indirect light reception section, the difference between the corrected amount of received light and the amount of light received at the time of full irradiation decreases, and the possibility that the light reception section 52a will be falsely determined to be an indirect light reception section decreases. If the light reception section 52a is an indirect light reception section, the amount of light received in the overlap region 60 is corrected to the amount of light including indirect light. However, the amount of light received in a part other than the overlap region 60 of the light reception section 52a at the time of partial irradiation is smaller than the amount of light received at the light reception section 52a at the time of full irradiation. Thus, the difference between the amount of light received in the part other than the overlap region 60 of the light reception section 52a at the time of full irradiation and the amount of light received at the light reception section 52a at the time of full irradiation may be equal to or more than the threshold amount, and it may be detected that the light reception section 52a is an indirect light reception section.

The overview of the optical detection device 10 according to an exemplary embodiment is as described above. Hereinafter, a process performed by the optical detection device 10 according to an exemplary embodiment will be described with reference to a flowchart illustrated in FIG. 17.

In step S10, the processor 20 controls the light emitter 12 to perform full irradiation. Then, the processor 20 acquires information about the amount of light received at each of the light reception sections 52 at the time of full irradiation and stores the acquired information about the amount of received light into the memory 16.

In step S12, the processor 20 controls the light emitter 12 to perform partial irradiation. Then, the processor 20 acquires information about the amount of light received at each of the light reception sections 52 at the time of partial irradiation and stores the acquired information about the amount of received light into the memory 16.

In step S14, the processor 20 determines whether or not there is a light reception section 52 in which the difference between the amount of light received at the time of full irradiation and the amount of light received at the time of partial irradiation is equal to or more than a threshold amount. In the case where there is no light reception section 52 in which the difference between the amount of light received at the time of full irradiation and the amount of light received at the first partial irradiation is equal to or more than the threshold amount, the processor 20 determines whether or not there is a light reception section 52 in which the difference between the amount of light received at the time of full irradiation and the amount of light received at the time of second partial irradiation is equal to more than the threshold amount. In the case where there is no light reception section 52 in which the difference between the amount of light received at the time of full irradiation and the amount of light received at the time of partial irradiation is equal to or more than the threshold amount even when all the irradiation sections 32 within the area of interest 34 are irradiated with light by the partial irradiations, the process proceeds to step S26. In the case where there is a light reception section 52 in which the difference between the amount of light received at the time of full irradiation and the amount of light received at the time of any one of the partial irradiations is equal to or more than the threshold amount, the process proceeds to step S16. The processing of step S14 corresponds to an indirect light detection process.

In step S16, the processor 20 controls the light emitter 12 to irradiate one adjacent irradiation section that is adjacent to the irradiation section 32 corresponding to an indirect light reception section identified in step S14. Then, the processor 20 acquires information about the amount of light received at the indirect light reception section and stores the information about the amount of received light into the memory 16.

In step S18, the processor 20 determines whether or not all the adjacent irradiation sections have been irradiated with light. In the case where all the adjacent irradiation sections have not been irradiated with light, the process proceeds to step S20. In step S20, the processor 20 selects another adjacent irradiation section, and controls the light emitter 12 to irradiate the adjacent irradiation section selected in step S20 with light in step S16. Then, the processor 20 acquires information about the amount of light received at the indirect light reception section and stores the information about the amount of received light into the memory 16.

In the case where it is determined in step S18 that all the adjacent irradiation sections have been irradiated with light, the process proceeds to step S22.

In step S22, the processor 20 identifies an indirect light source irradiation section on the basis of comparison between amounts of light received at the indirect light reception section at the time when the adjacent irradiation sections are irradiated with light. The processing of steps S16 to S22 corresponds to an indirect light source irradiation section identifying process.

In step S24, the processor 20 controls the light emitter 12 to make the amount of light applied to the indirect light source irradiation section smaller than the amounts of light applied to the irradiation sections 32 other than the indirect light source irradiation section identified in step S22.

In step S26, the processor 20 performs an object presence/absence detection process for detecting the detection object T or a distance measurement process for measuring the distance to the detection object T on the basis of light applied to the irradiation region 30 from the light emitter 12 under control in step S24.

<First Modification>

A first modification will be described. The overview of the configuration of the optical detection device 10 according to the first modification is similar to that of an exemplary embodiment described above. The first modification is different from the exemplary embodiment described above in the details of an indirect light detection process and an indirect light source irradiation section identifying process performed by the processor 20.

In the exemplary embodiment described above, the processor 20 performs the indirect light detection process on the basis of the amount of light received at each of the light reception sections 52. In the first modification, however, the processor 20 performs a distance measurement process to generate a distance image indicating the distance to the detection object T and the like, and performs the indirect light detection process and the indirect light source irradiation section identifying process on the basis of the generated distance image.

Specifically, the processor 20 causes the light emitter 12 to perform full irradiation, performs the distance measurement process on the basis of the timing at which light is emitted from the light emitter 12 and the timing at which reflected light is received by the light receiver 14, and generates a distance image indicating the distance to the detection object T and the like. The distance image is an image in which information indicating a distance to an object represented by each pixel is added to the pixel. In a similar manner, the processor 20 causes the light emitter 12 to perform partial irradiation, performs the distance measurement process on the basis of the timing at which light is emitted from the light emitter 12 and the timing at which reflected light is received by the light receiver 14, and generates a distance image. In the partial irradiation, not the whole area of interest 34 is irradiated with light. Thus, a distance image obtained by the partial irradiation indicates a distance to the detection object T and the like in part of the irradiation region 30.

When the light receiver 14 receives indirect light, the accuracy of measurement of the distance to the detection object T and the like in the distance image significantly decreases. Thus, if indirect light is received at the time of full irradiation but indirect light is not received at the time of partial irradiation, the distance indicated by the distance image obtained at the time of full irradiation is greatly different from the distance indicated by the distance image obtained by partial irradiation. Thus, the processor 20 calculates, for each of the pixels included in the distance image obtained by the distance measurement process, the difference between the distance indicated by the distance image for full irradiation and the distance indicated by the distance image for partial irradiation (only pixels for which distance is measured). In the case where the difference is equal to or more than a threshold distance, the processor 20 is able to detect that at least one of the plurality of light reception sections 52 has received indirect light at the time of full irradiation.

As in the exemplary embodiment described above, in the case where there is no pixel for which the distance indicated by the distance image for full irradiation and the distance indicated by the distance image for the first partial irradiation is equal to or more than the threshold distance, the second partial irradiation in which the irradiation sections 32 irradiated with light by the first partial irradiation are not irradiated with light but irradiation sections 32 not irradiated with light by the first partial irradiation are irradiated with light, is performed, and processing similar to that for the first partial irradiation is performed.

<Second Modification>

A second modification will be described. The overview of the configuration of the optical detection device 10 according to the second modification is similar to that of an exemplary embodiment described above. The second modification is different from the exemplary embodiment described above in an operation of the light emitter 12 (control on the light emitter 12 by the processor 20), an operation of the light receiver 14, and the details of the indirect light detection process and the indirect light source irradiation section identifying process performed by the processor 20.

In the second modification, the processor 20 controls the light emitter 12 to sequentially irradiate the area of interest 34 one part by one part. That is, the processor 20 controls the light emitter 12 to irradiate the entire area of interest 34 at different timings. A part of the area of interest 34 may be, for example, one irradiation section 32 included in the area of interest 34. However, a part of the area of interest 34 is not necessarily one irradiation section 32 included in the area of interest 34. For example, the processor 20 controls the light emitter 12 to cause a plurality of light emission sections 42 corresponding to a plurality of irradiation sections 32 included in the area of interest 34 to sequentially emit light.

In the second modification, the light receiver 14 includes the plurality of light-receiving elements 50 that receive reflected light that has been emitted from the light emitter 12 and reflected on the detection object T and the like. Furthermore, in the second modification, the plurality of light-receiving elements 50 are divided into the light reception sections 52 corresponding to the irradiation sections 32 and the light emission sections 42.

In the second modification, the light receiver 14 is capable of performing processing such as full light reception and partial light reception. Full light reception represents processing for causing the light emitter 12 to sequentially irradiate the area of interest 34 one part by one part and collectively outputting all the light reception results (electric signals indicating the amounts of light received at the light reception sections 52) after completing full irradiation on the area of interest 34. Partial light reception represents processing for, every time that the light emitter 12 irradiates a part of the area of interest 34, outputting a light reception result for a light reception section 52 corresponding to the part of the area of interest 34. In the case of the partial light reception, only a light reception section 52 of the light receiver 14 corresponding to a part irradiated with light (for example, an irradiation section 32) may receive light.

The processor 20 calculates, for each of the light reception sections 52, the difference between the amount of light received by the light receiver 14 at the time of full light reception and the amount of light received by the light receiver 14 at the time of partial light reception. A case where an indirect light source irradiation section is present within the area of interest 34 will be discussed. In the case of full light reception, since a part including the indirect light source irradiation section is irradiated with light, the amount of light received at an indirect light reception section that receives indirect light caused by the light applied to the indirect light source irradiation section includes the amount of received indirect light. In contrast, in the case of partial light reception, in the case where a part not including an indirect light source irradiation section within the area of interest 34 is irradiated with light, the amount of light received at each of the light reception sections 52 including an indirect light reception section does not include indirect light. That is, there is a difference between the amount of light received at the indirect light reception section at the time of full light reception and the amount of light received at the indirect light reception section at the time of partial light reception (for more details, the amount of light received at the time of full irradiation increases by the amount of indirect light).

Thus, in the case where there is a light reception section 52 in which the difference between the amount of light received at the time of full light reception and the amount of light received at the time of partial light reception is equal to or more than a threshold light reception amount, the processor 20 is able to detect that the light receiver 14 (at least one of the plurality of light reception sections 52) receives indirect light at the time of full light reception. In particular, the corresponding light reception section 52 is identified as an indirect light reception section.

<Third Modification>

In an exemplary embodiment described above, to reduce the number of sections to be checked in the processing for identifying an indirect light source irradiation section, only adjacent sections to which indirect light is incident relatively easily are checked. Obviously, however, a section may receive indirect light from a non-adjacent section. Thus, all the sections may be checked. For example, in the case where there are a large number of sections, an indirect light source irradiation section may be identified on the basis of the amount of light received at an adjacent region as in the exemplary embodiment described above. Alternatively, the area of interest may be reset such that all the sections within the area of interest are able to be checked. For example, a large area may first be set as an area of interest. In the case where a difference occurs, the area of interest may be narrowed to include only a section where the difference occurs and sections around the section where the difference occurs. Then, if there is still a similar difference, all the sections within the narrowed area of interest may be checked. In the case where a difference occurs when a large area of interest is set and no difference occurs after the area of interest is narrowed, an indirect light source irradiation section may be identified on the basis of the amount of light received at an irradiation section included in the wide area of interest but not included in the narrowed area of interest.

<Fourth Modification>

In an exemplary embodiment described above, indirect light is detected. However, in the case where indirect light is not detected, an area of interest may be detected by full irradiation or full light reception, so that the irradiation time, the reading time, and the load may be reduced.

<Fifth Modification>

In the exemplary embodiment described above, an indirect light source irradiation section is identified and then processing is performed. However, only detection of a difference may be performed, and identification of an indirect light source irradiation section is not necessarily performed. In this case, without performing full irradiation or full light reception, partial irradiation such as sequential lighting may be performed, and only a corresponding light reception section may be read from a light receiver on each occasion.

<Sixth Modification>

In the case where indirect light is detected, by reducing part of irradiation sections or performing partial irradiation or partial light reception, the influence of the indirect light is reduced. However, it takes a long time or other detection objects may be affected. Furthermore, a specific object that causes indirect light may disappear. Thus, it is desirable that, after indirect light is detected and a change to corresponding irradiation or corresponding light reception is made, detection of indirect light may be performed at regular time intervals.

<Seventh Modification>

Although the indirect light detection process and the object presence/absence detection process have been described as separate processes, the indirect light detection process and the object presence/absence detection process may partially overlap.

<Eighth Modification>

An example in which part of irradiation sections is reduced has been described above. However, data of all sections may be unnecessary. For example, the size of an object may be relatively large or data may include a part not necessary for authentication. Thus, distance measurement may be performed based on data of a light reception section that is less affected by indirect light. Furthermore, in this case, with an irradiation configuration that causes an overlap region, the amount of light from other non-corresponding irradiation sections increases. Thus, detection may be easily achieved. However, in such a case, due to a low intensity of light, the signal-to-noise ratio deteriorates. Thus, the ratio of interpolation may be changed in photograph data or peripheral distance detection data.

<Ninth Modification>

In an exemplary embodiment described above, an irradiation region is defined in a space. However, irradiation may be made on the inside of a human being or an object.

The present disclosure is not intended to be limited to the exemplary embodiments described above. Various changes may be made without departing from the spirit of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An optical detection device comprising:
   a light emitter that irradiates an area of interest;
   a light receiver that receives reflected light that has been emitted by the light emitter and reflected on a detection object, the light receiver including a plurality of light-receiving elements divided into a plurality of light reception sections; and
   a processor configured to perform at least one of full irradiation for irradiating the whole area of interest and full light reception for outputting all light reception results and at least one of partial irradiation for irradiating part of the area of interest and partial light reception for outputting part of the light reception results one part by one part and perform an object detection process for detecting the detection object in accordance with light received by the light receiver,
   wherein the processor is configured to, based on a difference between an amount of received light received at each of the light reception sections at a time when the light emitter performs the full irradiation and an amount of received light received at each of the light reception sections at a time when the light emitter performs the partial irradiation, perform an indirect light detection process for detecting that at least one of the plurality of light reception sections receives indirect light when the light emitter performs the full irradiation.

2. The optical detection device according to claim 1,
wherein the area of interest is divided into a plurality of irradiation sections corresponding to the plurality of light reception sections,
wherein the light emitter is configured to be capable of performing the full irradiation and the partial irradiation, the light emitter irradiating all the irradiation sections within the area of interest in the full irradiation and irradiating part of the irradiation sections within the area of interest in the partial irradiation,
wherein each of the light reception sections is defined as receiving light that has been emitted from the light emitter toward a corresponding irradiation section and reflected on the detection object, and
wherein the processor is configured to detect that, when the light emitter performs the full irradiation, at least one of the plurality of light reception sections corresponding to the plurality of irradiation sections within the area of interest receives the indirect light.

3. The optical detection device according to claim 2, wherein the light emitter includes a plurality of light-emitting elements divided into a plurality of light emission sections corresponding to the plurality of irradiation sections, and the light emitter causes all the light emission sections that emit light to the irradiation sections within the area of interest to emit light in the full irradiation and causes the light emission sections that emit light to part of the irradiation sections within the area of interest to emit light in the partial irradiation.

4. The optical detection device according to claim 2,
wherein the irradiation sections are arranged in a first direction, and
wherein the light emitter irradiates the plurality of irradiation sections in the partial irradiation such that irradiation sections irradiated with light and irradiation sections not irradiated with light are arranged alternately in the first direction.

5. The optical detection device according to claim 1,
wherein the light emitter emits pulsed light rays,
wherein the processor is configured to, in the object detection process and the indirect light detection process, define an accumulated value of amounts of reflected light of the plurality of pulsed light rays received at each of the light reception sections as the amount of received light, and
wherein the number of times of accumulation for the reflected light of the plurality of pulsed light rays in the indirect light detection process is smaller than the number of times of accumulation for the reflected light of the plurality of pulsed light rays in the object detection process.

6. The optical detection device according to claim 2, wherein the processor is configured to, based on an amount of received light received at an indirect light reception section, which is the light reception section that has received the indirect light, at a time when an irradiation section not corresponding to the indirect light reception section is irradiated, identify an indirect light source irradiation section, which is an irradiation section relating to light that has caused the indirect light received at the indirect light reception section.

7. The optical detection device according to claim 6, wherein the processor is configured to, based on an amount of received light received at the indirect light reception section at a time when an adjacent irradiation section adjacent to the irradiation section corresponding to the indirect light reception section, which is the light reception section that has received the indirect light, is irradiated, identify the indirect light source irradiation section, which is the irradiation section relating to the light that has caused the indirect light received at the indirect light reception section.

8. The optical detection device according to claim 6, wherein the processor is configured to perform the object detection process by reducing an amount of irradiation with light on the indirect light source irradiation section compared to amounts of irradiation with light on irradiation sections other than the indirect light source irradiation section.

9. The optical detection device according to claim 1,
wherein the processor is configured to:
in a case where indirect light is not detected in the indirect light detection process, perform object detection by at least one of the full irradiation and the full light reception; and
in a case where indirect light is detected, perform object detection by at least one of the partial irradiation and the partial light reception.

10. The optical detection device according to claim 2,
wherein each of the light reception sections includes, in an edge part of the light reception section, an overlap region that overlaps with an edge part of an adjacent light reception section, and
wherein the processor is configured to, in a case where the light emitter performs the partial irradiation, correct an amount of received light received in the overlap region that overlaps with the light reception section corresponding to the irradiation section not irradiated with light, of the amount of received light received at the light reception section corresponding to the irradiation section irradiated with light, based on the amount of received light received in the overlap region at the time of full irradiation, and then acquire the difference.

11. An optical distance measurement device comprising:
the optical detection device according to claim 1,
wherein the processor is configured to perform a distance measurement process for reducing influence of indirect light detected by the indirect light detection process and then measuring a distance to a measurement object as the detection object in accordance with light received by the light receiver.

12. An optical distance measurement device comprising:
the optical detection device according to claim 2,
wherein the processor is configured to perform a distance measurement process for reducing influence of indirect light detected by the indirect light detection process and then measuring a distance to a measurement object as the detection object in accordance with light received by the light receiver.

13. An optical distance measurement device comprising:
the optical detection device according to claim 3,
wherein the processor is configured to perform a distance measurement process for reducing influence of indirect light detected by the indirect light detection process and then measuring a distance to a measurement object as the detection object in accordance with light received by the light receiver.

14. An optical distance measurement device comprising:
the optical detection device according to claim 4, wherein the processor is configured to perform a distance measurement process for reducing influence of indirect light detected by the indirect light detection process and then measuring a distance to a measurement object as the detection object in accordance with light received by the light receiver.

15. An optical distance measurement device comprising: the optical detection device according to claim 5, wherein the processor is configured to perform a distance measurement process for reducing influence of indirect light detected by the indirect light detection process and then measuring a distance to a measurement object as the detection object in accordance with light received by the light receiver.

16. An optical distance measurement device comprising: the optical detection device according to claim 6, wherein the processor is configured to perform a distance measurement process for reducing influence of indirect light detected by the indirect light detection process and then measuring a distance to a measurement object as the detection object in accordance with light received by the light receiver.

17. An optical distance measurement device comprising: the optical detection device according to claim 7, wherein the processor is configured to perform a distance measurement process for reducing influence of indirect light detected by the indirect light detection process and then measuring a distance to a measurement object as the detection object in accordance with light received by the light receiver.

18. An optical distance measurement device comprising: the optical detection device according to claim 8, wherein the processor is configured to perform a distance measurement process for reducing influence of indirect light detected by the indirect light detection process and then measuring a distance to a measurement object as the detection object in accordance with light received by the light receiver.

19. An optical distance measurement device comprising:
a light emitter that irradiates an area of interest;
a light receiver that receives reflected light that has been emitted from the light emitter and reflected on a detection object, the light receiver including a plurality of light-receiving elements divided into a plurality of light reception sections; and
a processor configured to perform at least one of full irradiation for irradiating the whole area of interest and full light reception for outputting all light reception results and at least one of partial irradiation for irradiating part of the area of interest and partial light reception for outputting part of the light reception results one part by one part and perform a distance measurement process for measuring a distance to a measurement object in accordance with light received by the light receiver,
wherein the processor is configured to perform, based on a difference, calculated for individual pixels included in a distance image obtained by the distance measurement process, between a distance indicated by a distance image obtained when the light emitter performs the full irradiation or the full light reception and a distance indicated by a distance image obtained when the light emitter performs the partial irradiation or the partial light reception, an indirect light detection process for detecting that at least one of the plurality of light reception sections has received indirect light.

20. A non-transitory computer readable medium storing a program causing a computer to execute a process for optical detection, the process comprising:
performing, based on light emitted from a light emitter, reflected on a detection object, and received by a light receiver, an object detection process for the detection object,
the light emitter being capable of performing at least one of full irradiation on and full light reception in an interest of area and at least one of partial irradiation on and partial light reception in part of the area of interest,
the light receiver including a plurality of light-receiving elements divided into a plurality of light reception sections; and
performing, based on a difference between an amount of received light received at each of the light reception sections at a time of the full irradiation or the full light reception and an amount of received light received at each of the light reception sections at a time of the partial irradiation or the partial light reception, an indirect light detection process for detecting that at least one of the plurality of light reception sections has received indirect light.

* * * * *